United States Patent [19]

Bugga et al.

[11] Patent Number: 4,945,012
[45] Date of Patent: Jul. 31, 1990

[54] COPPER CHLORIDE CATHODE FOR A SECONDARY BATTERY

[75] Inventors: Ratnakumar V. Bugga, Arcadia; Salvador Distefano, Alhambra; Ganesan Nagasubramanian, La Crescenta; Clyde P. Bankston, Studio City, all of Calif.

[73] Assignee: The United States of America as represented by the Administrator, National Aeronautics and Space Administration, Washington, D.C.

[21] Appl. No.: 405,169

[22] Filed: Sep. 11, 1989

[51] Int. Cl.$^5$ ............................................... H01M 6/20
[52] U.S. Cl. ..................................... 429/103; 429/120
[58] Field of Search ................................ 429/103, 120

[56] References Cited

U.S. PATENT DOCUMENTS 3,877,984 4/1975 Werth .................................. 429/103
4,546,055 10/1985 Coetzer et al. ..................... 429/103

OTHER PUBLICATIONS

Miller, Exploring the Cell: Sodium/β-Alumina/Cupric Chloride—Aluminum Chloride—Sodium Chloride Between 136° and 200° C., NASA Technical Mem. Nasa TMS-3245 (1975).
M. Liu, "Degradation of Sodium B" Alumina Electrolyte in Contact with Sulfur/Sodium Polysulfide Melts", Lawrence Berkely Laboratory, Report 1986, LBL-21563; see Energy Abstr., 1986, 11(32), Abst. No. 50849.
J. J. Auborn and S. M. Granstaff, Jr., J. Energy, 6 (1982), 86–90.
G. Mamantov, R. Marassi, M. Matsunga, Y. Ogata, J. P. Wianux and E. J. Frazer, J. Electrochem. Soc., 127, 2319 (1980).
G. Mamantov, "Rechargeable High-Voltage Low-Temperature Molten-Salt Cell Na/B" Alumina/SCl$_3$+ in AlCl$_3$-NaCl", Final Report for Lawrence Berkeley Laboratory, LBL-21653, Dec. 1985.
J. Coetzer, J. Power Sources, 18, 377 (1986).
R. C. Galloway, J. Elec Trochem. Soc., 134, 256 (1987).
R. J. Bones, J. Coetzer, R. C. Galloway and D. A. Teagle, J. Electrochem. Soc., 134, 2379 (1987).
R. J. Wedlake, A. R. Tilley and D. A. Teagle, Bull. Electrochem. 4, 41 (1988).

Primary Examiner—Stephen J. Kalafut
Attorney, Agent, or Firm—Thomas H. Jones; John R. Manning; Charles E. B. Glenn

[57] ABSTRACT

Higher energy and power densities are achieved in a secondary battery based on molten sodium and a solid, ceramic separator such as a beta alumina and a molten catholyte such as sodium tetrachloroaluminate and a copper chloride cathode. The higher cell voltage of copper chloride provides higher energy densities and the higher power densities result from increased conductivity resulting from formation of copper as discharge proceeds.

19 Claims, 2 Drawing Sheets

COPPER CHLORIDE CATHODE FOR A SECONDARY BATTERY

ORIGIN OF THE INVENTION

The invention described herein was made in the performance of work under a NASA contract, and is subject to the provisions of Public Law 96-517 (35 USC 202) in which the Contractor has not elected to retain title.

TECHNICAL FIELD

The present invention relates to a secondary battery and more particularly, this invention relates to a battery containing liquid metal and a copper chloride cathode, such as a rechargeable sodium or lithium battery having high energy density and high power density.

BACKGROUND OF THE INVENTION

New types of energy sources are needed to power electronic devices, electric vehicles and to smooth peak power demands on electric utilities. Promising devices for electrochemical energy conversion are based on the use of a solid electrolyte separator such as ceramic, beta alumina solid electrolyte (BASE).

Two high power density, high energy density, high efficiency electrochemical power systems based on a liquid sodium anode and beta or beta"-alumina solid electrolyte (BASE) have been intensely studied. The alkali metal thermoelectric converter operates at a hot side temperature of 1000-1300K. and is potentially the most efficient non-mechanical thermal to electric converter for this temperature range. The sodium-sulfur battery is an extremely high energy density secondary (rechargeable) battery operating at 600-700K.

STATEMENT OF PRIOR ART

Since the discovery in 1962 by Joseph Kummer and Neill Weber (1) that the material $\beta''$-alumina was a good sodium ion conductor, several studies were made on its use as a solid electrolyte separator in various battery systems with liquid sodium as anode. The interest for many years has been focused on sodium-sulfur battery (2) which has many attractive features such as high density (750 Wh/kg), high rate discharge capability permitted by a good (comparable to aqueous electrolytes) ionic conductivity of $\beta''$-alumina solid electrolyte (BASE) at high temperatures and long cycle life and life times. The cell operates typically at 350° C. and energy densities 150 Wh/kg have been demonstrated in finished cells (3). However, there are certain difficulties associated with the use of sodium-sulfur batteries. In particular, due to the highly corrosive nature of sulfide melts, material selection for the current collector in the positive electrode is very critical and limited to a few possible choices, e.g., molybdenum, chromium, carbon and some super alloys (3). Also, there is a likelihood of BASE degrading in polysulfide melts (4). Further, the inherent violent reaction between liquid sodium and liquid sulfur demands a rather sophisticated design of the battery to circumvent the safety problem in the event of failure of the solid electrolyte ceramic.

There has been no commercial exploitation of the sodium-sulfur high energy battery system despite over 22 years of development. The main deterrent factors are the corrosion of the positive electrode and cell components and safety related aspects.

Several alternate materials have been examined in the literature as positive electrodes, especially with chloroaluminate (mainly $AlCl_3$-NaCl melts) electrolytes. Interesting couples among these are $Na-SbCl_3$ (5), $Na/Cl_2$ (6), $Na/S_2Cl_2$ (7), etc. Mamantov and co-workers made a detailed study on NAS(IV) or $SCl_3^+$ cells (8,9). These systems have attractive energy densities but are not free from corrosion problems. A new class of inorganic materials, i.e., transition metal dichlorides, is gaining increasing attention as solid rechargeable cathodes in sodium batteries (10-13) These systems can operate at lower temperatures $\geq 180°$ C.; the corrosion problems are proportionally less severe. The relatively sluggish kinetics of the chemical reaction between liquid sodium and catholyte reduces the safety problem considerably (14). Also, the molten electrolyte $NaAlCl_4$ remains invariant under normal discharge/charge, thus reducing polarization losses, localized current densities and failure therefrom. Two metal chloride cathodes, i.e. ferrous chloride and nickel chloride have shown performance characteristics comparable to sodium sulfur in finished cells and demonstrated safety. The power density of these two cathodes is however lower than NaS.

LIST OF CITED REFERENCES

1. J. T. Kummer and N. Weber, Proc. SAE Congr., 1967 Paper 670179.
2. J. L. Sudworth and A. R. Tilley, "The Sodium Sulphur Battery," Chapman and Hall Ltd., N.Y., 1985 and references therein.
3. R. P. Tischer, "The Sulphur Electrode," Academic Press, N.Y., 1983.
4. M. Liu, "Degradation of Sodium $\beta''$Alumina Electrolyte in Contact with Sulfur/Sodium Polysulfide Melts," Lawrence Berkeley Laboratory, Report 1986 LBL-21563; see Energy Abstr, 1986, 11(32), Abst. No. 50849.
5. N. P. Yao and J. R. Selman, "Proc. Symp. Load Levelling," ECS, Princeton, N.J., 1977.
6. J. J. Werth, U.S. Pat. No. 3,847,667 (1974); U.S. Pat. No. 3,877,984 (1975).
7. J. J. Auborn and S. M. Granstaff, Jr., J. Energy, 6 (1982), 86-90.
8. G. Mamantov, R. Marassi, M. Matsunga, Y. Ogata, J. P. Wiaux and E. J. Frazer, J. Electrochem. Soc., 127, 2319 (1980).
9. G. Mamantov, "Rechargeable High-Voltage Low-Temperature Molten-Salt Cell Na/$\beta''$ Alumina/$SCl_3^+$ in $AlCl_3$-NaCl." Final report for Lawrence Berkeley Laboratory, LBL-21653, December 1985.
10. J. Coetzer, R. J. Bones, R. C. Galloway, D. A. Teagle and P. T. Moseley, U.S. Pat. No. 4,546,055 (1985).
11. J. Coetzer, J. Power Sources, 18, 377 (1986).
12. R. C. Galloway, J. Electrochem. Soc., 134, 256 (1987).
13. R. J. Bones, J. Coetzer, R. C. Galloway and D. A. Teagle, J. Electrochem. Soc. 134, 2379 (1987.)
14. R. J. Wedlake, A. R. Tilley and D. A. Teagle, Bull. Electrochem., 4, 41 (1988).

STATEMENT OF THE INVENTION

An improved high density battery system based on molten sodium and a solid, ceramic electrolyte is provided by the present invention. The battery system of the invention does not cause corrosion of the separator. The battery system exhibits high energy density over a wide range of operating temperatures 180°–450° C. without buildup of pressure. The cells of the invention demonstrate higher rates and higher rechargeability than secondary cells employing intercalatable cathodes. The cell voltage of the battery of the inventions is about 0.2 volts higher than a battery utilizing a nickel chloride cathode and about 0.5 volts higher than a battery with ferrous chloride. Higher cell voltage results in higher energy density. The theoretical energy density of the proposed cathode is 1190 w-h/Kg about 50 w-h/Kg higher than other state of the art materials of this type.

The battery system of the invention is similar to the sodium-sulfur system except that it does not use molten sulfur. The battery system of the invention uses a copper chloride cathode. This provides high power densities since the conductivity of the cathode increases in the course of discharge due to the formation of metallic copper. The catholyte includes a molten sodium salt which does not corrode the solid electrolyte separator. The copper chloride cathode results in high power densities and provides long life for the system. In addition, electrode fabrication is easier and is less costly.

Cells fabricated with the cathode of the invention demonstrate high power density and stability. No degradation of the solid separator or of the cathode materials was observed. Long term operation is promising.

The battery system of the invention could be important to future space exploration. Present designs include a solar array recharged Ni-Cd batteries as the best high power, long cycle life secondary battery system. Ni-Cd batteries are heavy. They usually make-up about one-half of the power system weight. The battery system of this invention could reduce the weight by a factor of 5 compared to Ni-Cd batteries. Since the battery system of the invention operates at temperatures of about 100 degrees lower than the sodium-sulfur battery, the thermal control requirements are both cheaper, safer and weigh less.

DETAILED DESCRIPTION OF THE INVENTION

The battery of the invention is based on a body of molten metal anode, solid ionic ceramic separator and a catholyte including a molten salt and a copper cathode. An anode current collector in contact with the body of molten sodium and a cathode is in contact with the catholyte. The anode current collector can take the form of a cylindrical or U-shaped metal tube such as stainless steel and the cathode can be an element such as sintered metal grid impregnated with copper chloride or directly sintered copper chloride suspended in the body of catholyte.

The battery configuration can be represented as follows:

| Anode Current Collector | Liquid Anode | Solid Electrolyte Separator | Catholyte | Cathode |
|---|---|---|---|---|

The liquid anode is a Group I metal preferably sodium, potassium or lithium or alloys thereof such as NaK. The solid electrolyte is preferably a thin film of beta alumina. Beta-alumina and beta"-alumina or their mixtures are members of the class of materials known as solid electrolytes or fast ion conductors. These materials have ionic conductivities much larger than their electronic conductivities and thus act as electrolytes and separators. Beta"-alumina solid electrolyte (BASE) has a much higher sodium conductivity than Beta-alumina and is crystalline solid melting at 2253K., having the nominal composition Na$_{5/3}$Li$_{1/3}$Al$_{32/3}$O$_{17}$ and is usually fabricated as a dense microcrystalline sintered ceramic. It is inert to reaction with elemental sodium at temperatures as high as 1300K. Its Na$^+$ conductivity at 350° C. is 0.2–0.4 ohm$^{-1}$ cm$^{-1}$.

The solid electrolyte can assume different configurations such as a flat barrier film or the solid electrolyte can be provided in cylindrical form. The surface can be planar or corrugated. The solid electrolyte is usually utilizes a fairly thin film, typically having a thickness from 0.01 to 0.2 cm, generally around 0.1 cm.

The liquid catholyte comprises a mixture of a metal salt which is molten at the operating temperature of the battery. The molten salt is preferably a Group I metal salt and can be a mixture of Group I and Group III metal salt such as a sodium tetrachloroaluminate (NaAlCl$_4$). The molten salt is preferably maintained basic. The ratio of NaAl:AlCl$_3$ preferably about 1/1.

The cell reaction can be written as follow:

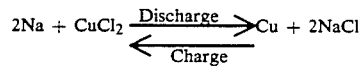

In the charged state the cathode consists of a porous substrate such as copper chloride. The cathode is immersed in the molten electrolyte, suitably NaAlCl$_4$. On discharge the Na$^+$ ions traverse the beta alumina solid separator and NaAlCl$_4$ to reduce the CuCl$_2$ to copper forming NaCl in the process. All of the cathode reactants, i.e. CuCl$_2$ and NaCl are insoluble in the NaAlCl$_4$ catholyte. Therefore, they remain in intimate contact with each other and with the cathode current collector. This insolubility of the cathode reactants is promoted by maintaining the melt basic with a NaCl:AlCl$_3$ ratio of 1/1.

Figure 1:
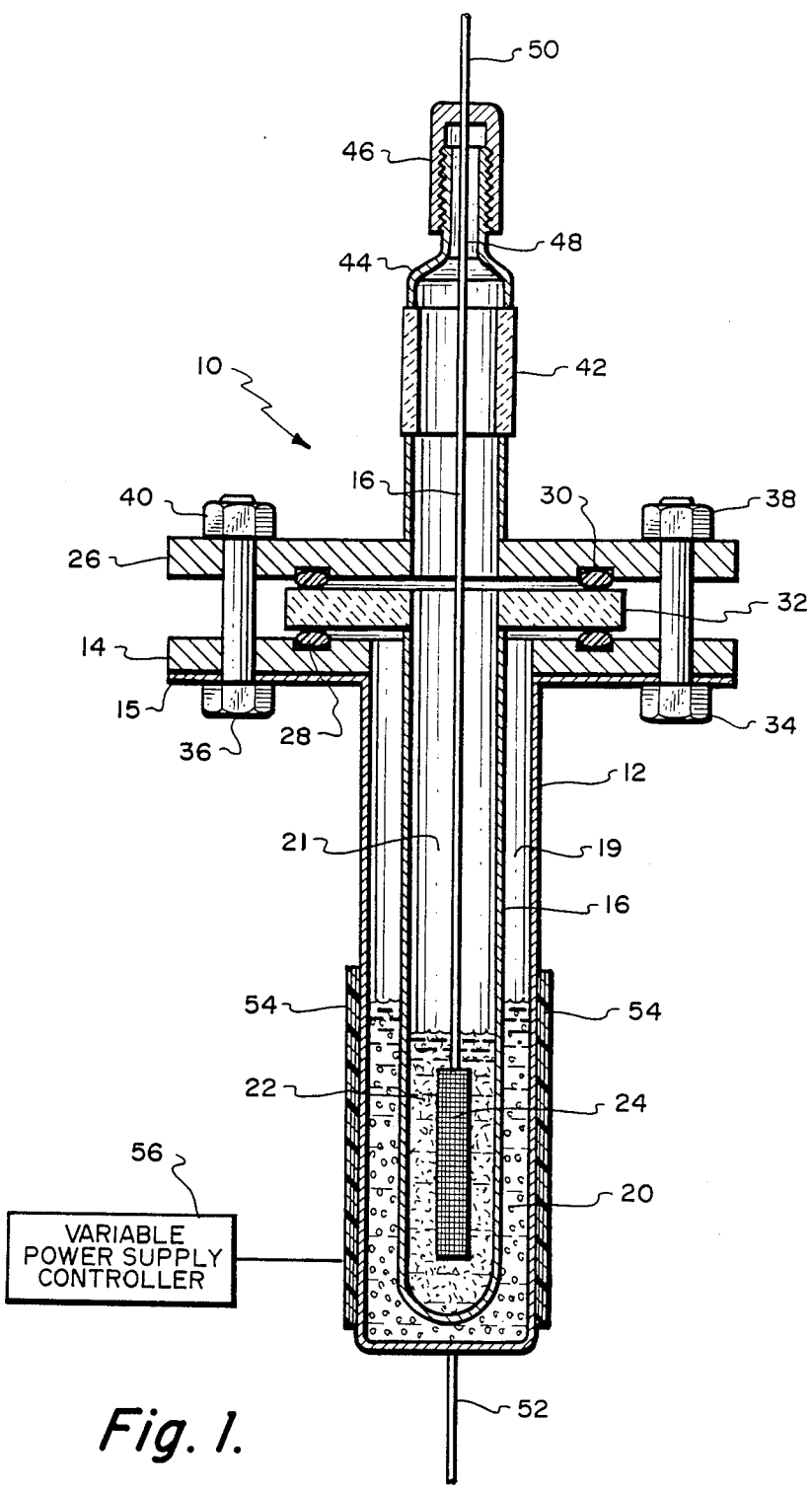
FIG. 1 is a schematic view of a battery in accordance with the invention.

Referring to FIG. 1, a battery cell 10 comprises an outer cylindrical tube 12 having a flange 14, suitably formed of a conductive, corrosion resistant metal such as stainless steel. A BASE tube 16 is supported within the outer tube 12 forming an annular chamber 19 between the outer tube 12 and the BASE tube 16 for receiving body 20 of liquid anode such as sodium. A second chamber 21 is formed within the BASE tube 16 for receiving a second body 22 of catholyte. A cathode 24 such as a porous, sintered nickel matrix impregnated with copper chloride or directly sintered copper chloride is immersed within the body 22 of catholyte.

A flange 26 is connected to the BASE tube 16 above and parallel to the flange 14. A ceramic spacer, insulator 32 such as alumina is disposed between the o-rings 28, 30. The interior opposed surfaces of the flanges 14, 26 are grooved to received o-rings 28, 30. The annular chamber 19 is sealed by the means of threaded connectors 34, 36 received through apertures in the flanges 14, 26 and tightened by means of nuts 38, 40. A ceramic insulator sleeve 42 can be provided on the upper neck 44 of the BASE tube 16. The top of the tube 16 can also be sealed with a cap 46 which receives the lead 48 connecting the cathode 24 to the positive terminal 50. The negative terminal 52 is connected to the outer tube 12. A heater tape 54 can be wrapped around the outer tube. The heater is connected to a variable power supply, controller 56.

A test apparatus was constructed according to the design of FIG. 1 and was operated to test and prove the system. The BASE tube 16 separates the liquid anode and catholyte and is supported by an α alumina flange 14 resting on the metallic flange 15 of the outer stainless steel tube. Inside the BASE tube is the molten electrolyte, $NaAlCl_4$, into which is immersed the $CuCl_2$ impregnated porous, sintered nickel matrix to act as the cathode. The top metallic half is bolted onto the metallic flange of the bottom portion with an aluminum o-ring placed between the plates. It is thus possible, in principle, to seal the anode (liquid sodium) half cell from the atmosphere, permitting the cell to be operated outside the glove box. The positive lead is connected to a metallic cap threaded onto the top lid. A ceramic ring in the top lid prevents shorting between the metallic cap (positive terminal) at the top, and the bottom metallic half (negative terminal). The cell is heated up electrically by a heating tape wound around the bottom stainless tube and its temperature monitored with a thermocouple in contact with the bottom stainless steel tube.

All the chemicals, $CuCl_2$, $NaAlCl_4$ as well as sodium were of analytical grade and were used as received. All the cell fabrication operations were carried out in an argon-filled glove box with oxygen concentration less than 10 ppm. $\beta''$-alumina ceramic was cleaned by etching in hot phosphoric acid.

The electrochemical cell employed for the following studies constitutes liquid sodium anode/$\beta''$-alumina solid electrolyte/sodium tetrachloroaluminate molten electrolyte and a $CuCl_2$ cathode. The cell is typically operated at 200° C. with an open circuit voltage of 2.85 volts.

Figure 2:
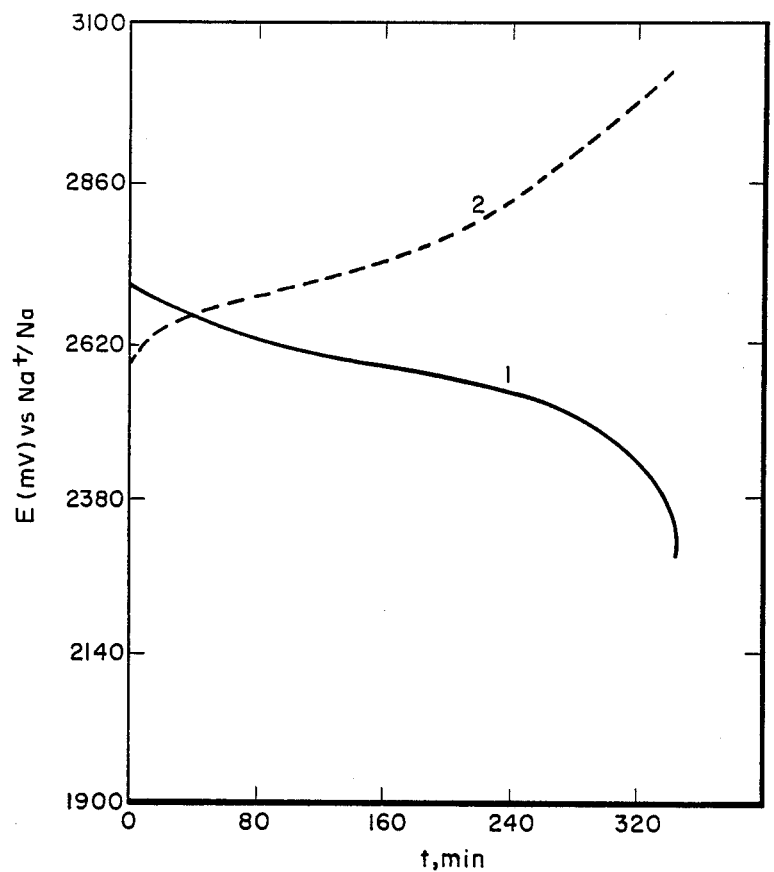
FIG. 2 gives the time voltage curves for the sodium/sodium beta"-alumina battery with a CuCl$_2$ cathode. Trace 1 is the third discharge cycle and trace 2 is the subsequent charge, at 10 mA/cm$^2$.

FIG. 2 shows that typical discharge-charge curves of the copper chloride cell. In laboratory testing several charge-discharge cycles have been demonstrated for this cell and steady operation at 200° C.

In summary the novel copper chloride cell can thus deliver about 10% greater energy density, as compared to current state of the art high energy density systems of this type. The battery of the invention can undergo a substantial number of charge-discharge cycles with no corrosion of the solid separator or other cell components.

It is to be realized that only preferred embodiments of the invention have been described and that numerous substitutions, modifications and alterations are permissible without departing from the spirit and scope of the invention as defined in the following claims.

We claim:
1. A battery system comprising in combination:
a first body of liquid Group I metal anode;
a second liquid catholyte body comprising a metal salt molten at the temperature of operation of the battery, said molten salt including a Group I metal salt;
a solid ceramic separator disposed between said first and second bodies capable of conducting ions from the first body to the second body;
a first metal current collector in contact with said first body; and
a positive electrode comprising a solid porous body incorporating solid copper chloride in contact with said second body said copper chloride being insoluble in said molten metal salt.
2. A battery system according to claim 1 in which the separator comprises alumina.
3. A battery system according to claim 1 in which the separator comprises beta alumina.
4. A battery system according to claim 1 in which the metal Group 1 is sodium.
5. A battery system according to claim 1 in which the molten metal salt is a sodium chloroaluminate.
6. A battery system according to claim 5 in which the molten metal salt is sodium tetrachloroaluminate.
7. A battery system according to claim 6 in which the ratio of NaCl to $AlCl_3$ in the tetrachloroaluminate is about 1.
8. A battery system according to claim 7 in which the positive electrode consists of transition metal chloride.
9. A battery system according to claim 8 in which the transition metal consists of copper.
10. A battery system according to claim 1 in which a first chamber for receiving the first body is formed between said first current collector and said ceramic separator.
11. A battery system according to claim 8 in which a second chamber for receiving the second body is formed by disposing a hollow tube of said separator within said first body.
12. A battery system according to claim 11 further including vapor-tight means for closing the first chamber.
13. A battery system according to claim 12 further including vapor-tight second means for closing the second chamber.
14. A battery system according to claim 1 further including means for heating the first and second bodies to a temperature at which both of said bodies are molten.
15. A battery according to claim 1 in which said porous body comprises a porous metal substrate impregnated with copper chloride.
16. A battery according to claim 15 in which the substrate is sintered metal.
17. A battery according to claim 16 in which the sintered metal substrate is formed of nickel.
18. A battery according to claim 1 in which the cathode is formed of sintered copper chloride.
19. A battery according to claim 15 in which the molten electrolyte is basic.

* * * * *